(12) United States Patent
Yeh

(10) Patent No.: US 6,947,664 B1
(45) Date of Patent: Sep. 20, 2005

(54) PORTABLE WARM BAG HAVING STEAM HEATING DEVICE

(76) Inventor: Yin-Ting Yeh, P.O. Box 697, Fongyuan City, Taichung County (TW) 420

(*) Notice: Subject to any disclaimer, the term of this patent is extended or adjusted under 35 U.S.C. 154(b) by 0 days.

(21) Appl. No.: 10/995,819

(22) Filed: Nov. 24, 2004

(51) Int. Cl.[7] .............................................. A61H 33/12
(52) U.S. Cl. ...................... 392/405; 392/403; 219/387; 219/401
(58) Field of Search ................ 392/403, 404, 392/405; 219/386, 387

(56) References Cited

U.S. PATENT DOCUMENTS 3,869,595 A * 3/1975 Collins et al. .............. 219/387

5,569,401 A * 10/1996 Gilliland et al. ............ 219/386

* cited by examiner

Primary Examiner—Thor S. Campbell

(57) ABSTRACT

A portable warm bag having steam heating device includes a rectangular bag having a pressure sensor, a pressure releasing valve, a switch bottom and a valve cover on both sides of the upper lid, a partition vertically disposed in the bag adjacent a lateral side thereof to define a gap therebetween to receive a vapor creater therein which supplies the vapor into the food containing space via a hose and through a perforated plate above the bottom of the bag, a power source compartment under the bottom of the bag containing a plurality of rechargeable batteries therein for heating a heating bar in the vapor creater to boil the water to create vapor to into the bag to establish a heating circulation into the food which is kept at constant temperature eatable to the user.

3 Claims, 4 Drawing Sheets

PORTABLE WARM BAG HAVING STEAM HEATING DEVICE

BACKGROUND OF THE INVENTION

The present invention relates to the food carrying apparatus and more particularly to a portable warm bag having steam heating device which is able to create steam circulating in the bag to heat the food to a desired temperature.

People are used to carry a portable warm bag containing food to go outdoor to sponsor a picnic or other activities. The food in the bag will be warm and eatable. FIG. 1 shows a prior art warm bag 10 which is made of heatproof material has a lid 11 connected with one edge of its opening and fastened by a zipper 13 and a suspender 12 connected with two lateral sides to facilitate the user to carry the bag 10. This type of warm bag 10 has at least the following disadvantages:

a) the heatproof effect is very pool. The temperature of the food in the bag can only keep few hours, especially in the winter time or snowing days, than the heatproof effect for food is rather worse it is no use for a worker, a student or a traveler, b) in summer time, although the temperature of the food containing in this bag may keep a longer time, but if there is no any heating device in the bag to continuously heat the food which will be easily fermented and/or deteriorated that becomes not eatable.

Some of the warm bags utilize the electricity to heat the food to keep the food at a constant temperature. Yet this type of warm bag has usually a large volume and the electricity is coming from an automobile which is unsuitable to a student or a worker because they need a small sized portable warm bag.

SUMMARY OF THE PRESENT INVENTION

The present invention has a main object to provide a portable warm bag having steam heating device which has self-support power source and a vapor creator to continuously provide the steam to heat the food which is kept at a constant temperature, no matter whether is in the summer or winter time.

Another object of the present invention is to provide a portable warm bag having steam heating device which not only keeps the temperature but also keeps the humidity of the food for which the original delicious condition is therefore maintained.

Accordingly, the portable warm bag of the present invention comprises generally a rectangular bag made of heatproof material and having a perforated plate above the bottom, a power source compartment under the bottom electrically connected with a vapor creator in an inner side of the bag and at least a hose having one end connected to an upper portion of the vapor creator and the other end extended downward to a space under the perforated plate. The vapor creator contains a predetermined amount of fresh water and a heating bar which is effected by the power source to boil the water to become vapor flowing out of the vapor creator through the hose so as to establish a steam heating circulation in the food.

The present invention will become more fully understood by reference to the following detailed description thereof when read in conjunction with the attached drawings.

DETAILED DESCRIPTION OF THE PREFERRED EMBODIMENT

Figure 1:
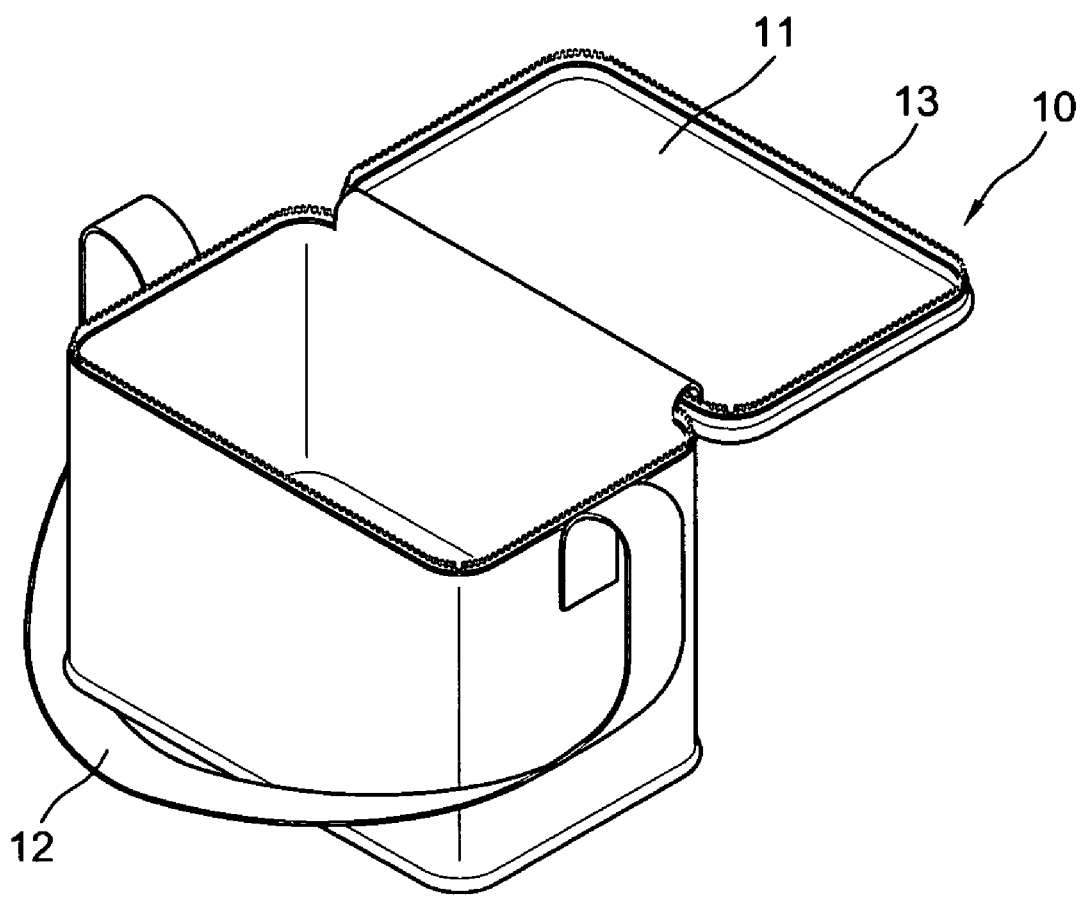
FIG. 1 is a perspective view of a portable warm bag according to a prior art.
Figure 2:
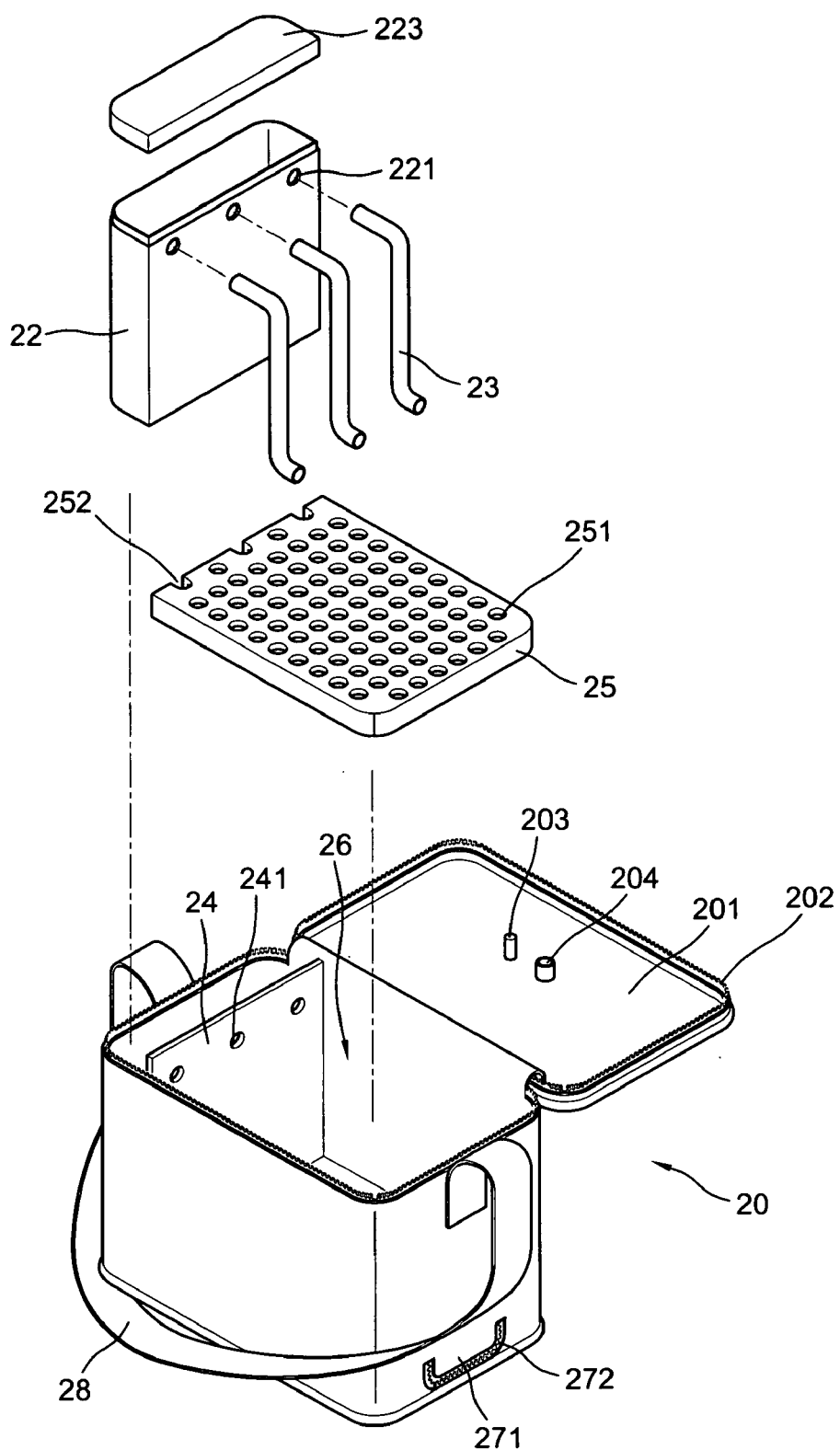
FIG. 2 is an exploded perspective view to show the preferred embodiment of the portable warm bag according to the present invention.
Figure 3:
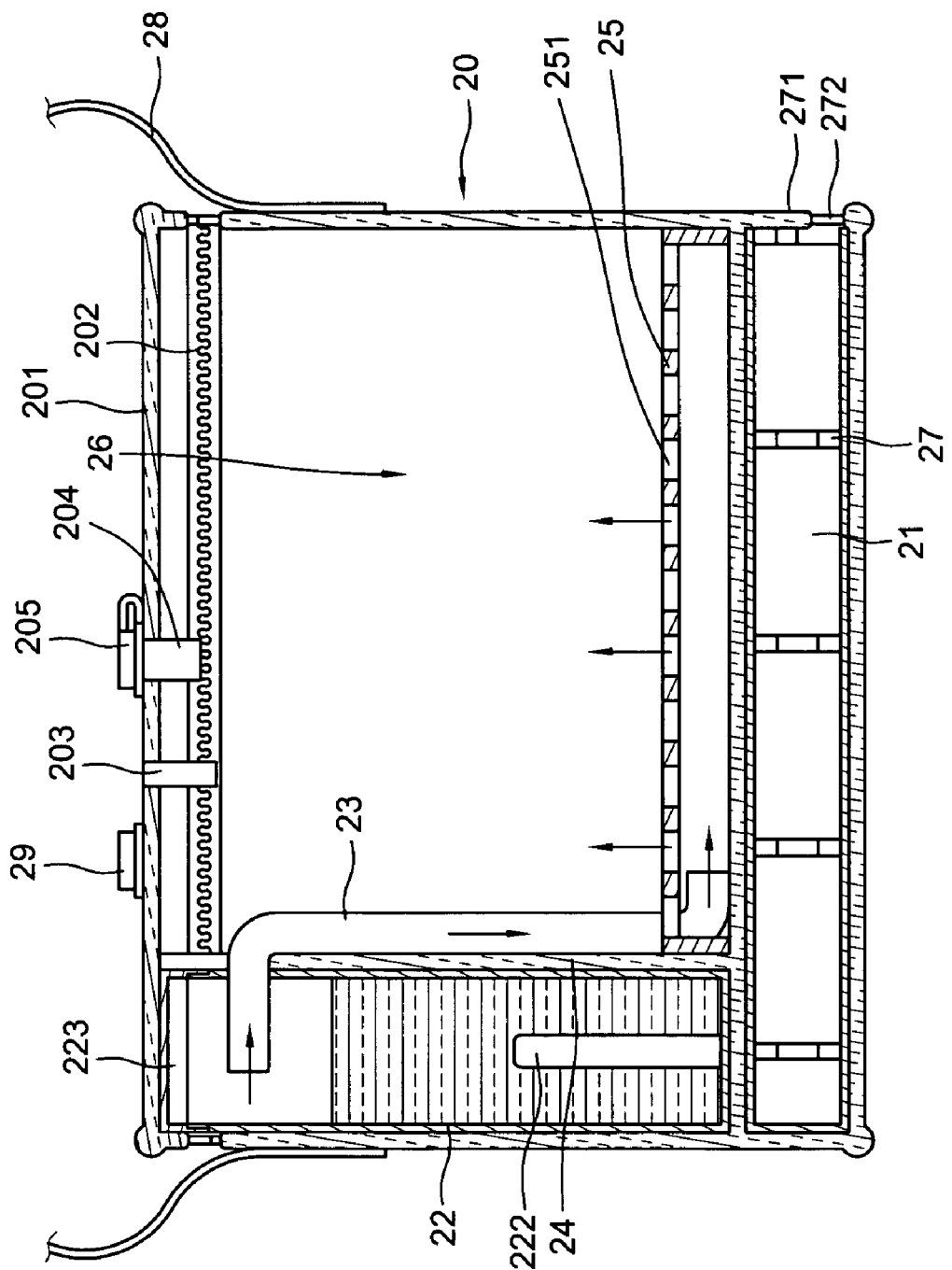
FIG. 3 is a sectional view showing the assembly of FIG. 2.
Figure 4:
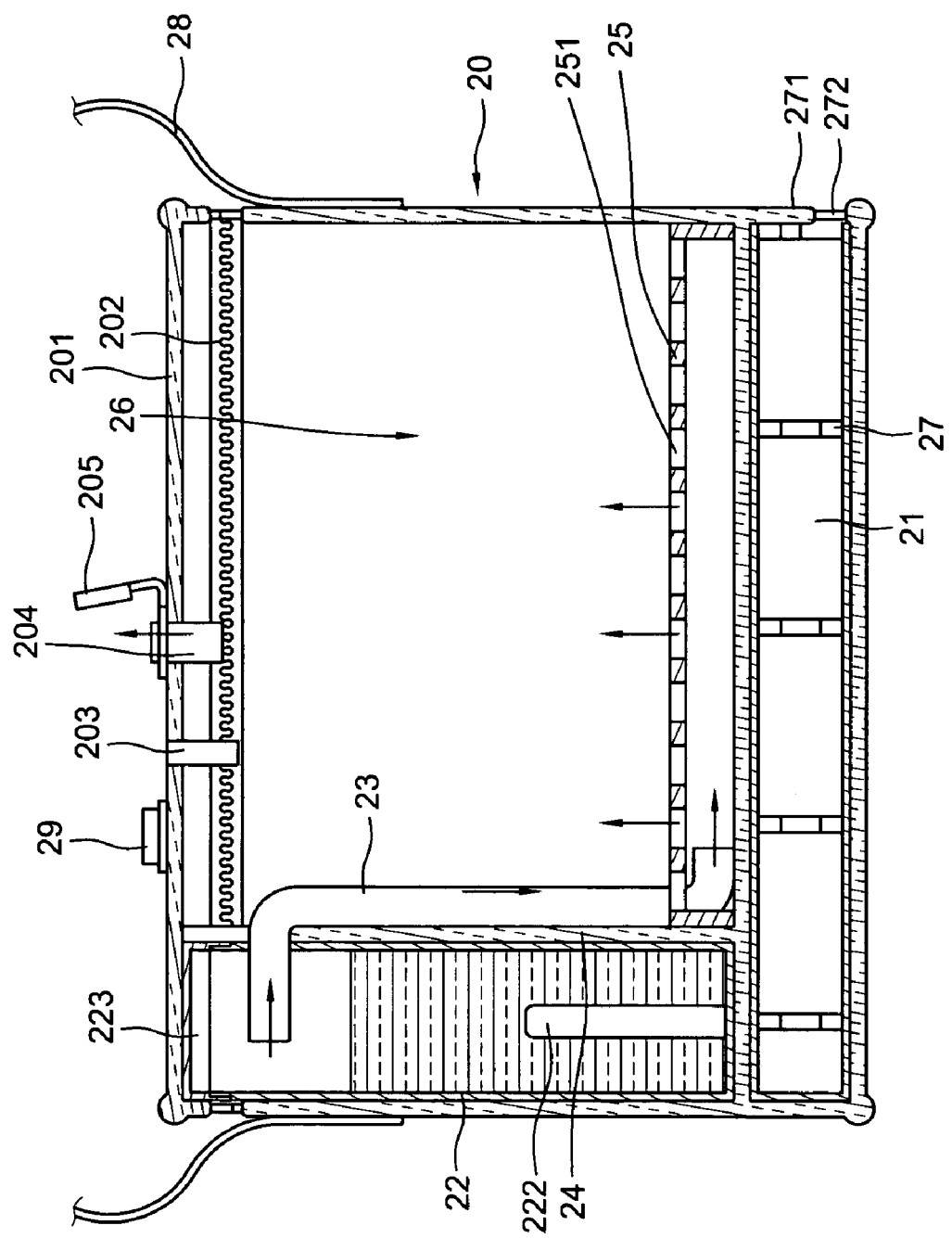
FIG. 4 is a sectional view indicating that a pressure releasing valve is opened to discharge the excessive steam in the bag.

With reference to FIGS. 1 to 4 of the drawings, the portable warm bag having steam heating device of the present invention comprises a rectangular bag 20 which is made of flexible heatproof material so is foldable and has a lid 201 on the top partially connected to an upper edge thereof and fastened by a first zipper 202, a temperature sensor 203 and a pressure releasing valve 204 spacedly disposed on the inner surface, a valve cap 205 and a switch button 29 spacedly disposed on the outer surface thereof, a partition 24 vertically disposed in the bag 20 adjacent a lateral wall of the bag 20 to define a gap therebetween for receiving a vapor creater 22, wherein the partition 24 has a plurality of first through holes 241 spacedly formed in upper portion and the vapor creater 22 is a box containing a predetermined amount of water and an upright heating bar 222 on the bottom, a cap 223 releasably closing the top and plurality of second through holes 221 spacedly formed in upper portion of a lateral wall engaged with the first through holes 241 of the partition 24, at least a hose 23 having upper end inserted into the vapor creater 22 through the through holes 221 and 241 and a lower end extended to the bottom of the bag 20, a perforated plate 25 disposed into the bag 20 above the bottom thereof having a plurality of voids 251 in the entire surface and a plurality of semi-circular slots 252 spacedly formed in an edge engaged with the hoses 23, a food containing space 26 above the perforated plate 25, a power source compartment 27 formed under the bottom of the bag 20 electrically connected with the heating bar 222 for containing a plurality of the rechargeable batteries 21 or a portable storage cell (not shown), an openable plate 271 closing the compartment 27 which is fastened by a second zipper 272 and a suspender 28 having two end respectively connected to the upper outer surface of two lateral walls of the bag 20 for carrying the bag 20.

Upon the above discussed structure, when press the switch button 29 downward, the batteries 21 immediately supply the electricity to heat the heating bar 222 which in turn heats the water in the vapor creater 22. When the water is boiled, the vapor is created and flowing into the space between the bottom of the bag 20 under the perforated plate 25 which leads the steam flowing upward to heat the containing food which is gradually becoming hot at a constant temperature. If the steam becomes stronger and stronger in bag 20 and the vapor pressure is found excessive. The user may open the cap 205 of the pressure releasing valve 204. Then opens the lid 201 of the bag 20 and picks the food to eat. The sensor 203 has the function to detect the pressure condition inside the bag 20. Once the sensor found the vapor pressure in the bag 20 is excessive, it will automatically turn off the power source. In addition, if the water in the vapor creater is consumed to a lowerst amount, the power source will be also turned off to allow the replenishing the fresh water into the vapor creater 22. So that the warm bag 20 of the present invention provide strong safety to the user even the partition 24 is able to prevent the user from to scalded by directly touching the vapor creater 22. Because the steam heating device can keep the food fresh in the original humidity and delicious condition. Besides, this warm bag 20 suits to the students, the workes, the travelers and in the picnic no matter it is used in the summer or winter time. Due to that this bag 20 is made of flexible heatproof material, it is foldable to facilitate the user keeping and or bring with it.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A portable warm bag having steam heating device comprising:

a rectangular bag having a lid on top partially connected with one edge thereof and fastened by a first zipper, a pressure sensor adjacent a pressure releasing valve on an inner side, a switch button and a valve cap spacedly disposed on an outer surface thereof, a partition vertically disposed into said bag adjacent a lateral wall to define a gap therebetween for disposing a vapor creater, wherein said partition has a plurality of first through hole formed spaced apart in an upper portion, said vapor creater including a predetermined amount of fresh water therein, a upright heating bar on bottom and a plurality of second through holes formed spaced apart in an upper portion of a inner wall engaged with the first through holes of said partition, at least a hose having an upper end inserted into the vapor creater through said first and second through holes and a lower end extended into a space under said perforated plate for supplying the vapor from said vapor creater and penetrated into the food containing space so as to form a steam heating circulation in the food, a power source compartment formed under the bottom of said bag electrically connecting the heating bar and the switch bottom respectively for receiving a plurality of rechargeable batteries therein which is blocked by a opendable plate and fastened by a second zipper, and a suspender having two ends respectively connected to an upper outer surface of lateral walls of said bag;

whereby, press the switch button downward, said power source immediately supplying electricity to heat said heating bar which boils the water to create vapor to flow out to the space in the bottom and penetrated the vapor into the food via said perforated plate to keep the food to be eatable at constant temperature.

2. The portable warm bag as recited in claim 1, wherein said bag is made of flexible heatproof material.

3. The portable warm bag as recited in claim 1, wherein said rechargeable batteries may be replaced with a portable storage cell.

* * * * *